United States Patent [19]

De Rooij

[11] Patent Number: 4,933,752
[45] Date of Patent: Jun. 12, 1990

[54] OPTICAL ASSEMBLY FOR A CAMERA HAVING AN IMAGE SENSOR AND METHOD OF MANUFACTURING SUCH AN OPTICAL ASSEMBLY

[75] Inventor: Jacobus A. G. De Rooij, Breda, Netherlands

[73] Assignee: U.S. Philips Corp., New York, N.Y.

[21] Appl. No.: 352,422

[22] Filed: May 16, 1989

[30] Foreign Application Priority Data

May 19, 1988 [NL] Netherlands ............... 8801291

[51] Int. Cl.⁵ ............................................. H04N 9/09
[52] U.S. Cl. ........................................ 358/55; 358/50; 358/229; 350/173
[58] Field of Search ............... 358/50, 51, 55, 213.11, 358/229; 350/170, 173

[56] References Cited

U.S. PATENT DOCUMENTS

| | | |
|---|---|---|
| 4,470,682 | 9/1984 | Suzuki et al. ................ 350/173 |
| 4,591,901 | 5/1986 | Andrewski .................. 358/55 |
| 4,622,580 | 11/1986 | Levine . | |
| 4,761,685 | 8/1988 | Asaida . | |
| 4,789,891 | 12/1988 | Kanayama et al. ........... 358/55 |
| 4,835,600 | 5/1989 | Harada et al. ............... 358/55 |

FOREIGN PATENT DOCUMENTS

| | | |
|---|---|---|
| 0016690 | 1/1986 | Japan . |
| 0267087 | 11/1988 | Japan . |
| 2078935 | 1/1982 | United Kingdom . |

Primary Examiner—James J. Groody
Assistant Examiner—Kim Yen Vu
Attorney, Agent, or Firm—William L. Botjer

[57] ABSTRACT

The invention relates to an optical assembly for a camera comprising a color-separation system 1 having three exit windows 3, 4 and 5. A solid-state image sensor 6, 7 and 8 is fixed in a desired position to each exit window 3, 4 and 5 by means of a holder 9, 10 and 11. Each holder 9, 10 and 11 comprises a first holder plate 12, 13, 14 having an aperture 45, 46, 47 and a second holder plate 15, 16, 17 having an aperture 48, 49, 50 and an elastically deformable element 18, 19, 20 which surrounds the apertures of a holder.

7 Claims, 4 Drawing Sheets

OPTICAL ASSEMBLY FOR A CAMERA HAVING AN IMAGE SENSOR AND METHOD OF MANUFACTURING SUCH AN OPTICAL ASSEMBLY

BACKGROUND OF THE INVENTION

The invention relates to an optical assembly for a camera, comprising a colour-separation system having an entrance window and at least one exit window, and a solid-state image sensor which is fixed opposite the or each exit window, and which comprises an image-receiving surface accommodated in an envelope.

The invention also relates to a method of manufacturing such an optical assembly.

The image-receiving surface of the solid-state image sensor of an optical assembly as mentioned in the opening paragraph is accommodated in an envelope and often the exact position of the image-receiving surface relative to the envelope is unknown. Consequently, also the position of the image-receiving surface relative to the exit window in question is not known.

To obtain a properly functioning camera for television, film and photographic recordings, it is desirable for the image-receiving surface of the image sensor to be secured to the relevant exit window in this aligned position.

It is an object of the invention to provide an optical assembly for a camera, which enables the image sensor to be previously secured to the relevant exit window in an aligned position, in a simple and accurate manner.

To this end, an optical assembly of the type mentioned in the opening paragraph is characterized in accordance with the invention in that the solid-state image sensor is fixed to the exit window by means of a holder which comprises two holder plates having facing apertures and which are fixed to the exit window and the solid-state image sensor respectively, an elastically deformable element cooperating with and acting between the holder plates, the holder plates being secured in a desired position relative to one another by fixation means. The invention is based on the insight that due to the use of two holder plates and an elastically deformable element which form an integrated entity and, in addition, cooperate with each other so as to enable the two holder plates to be positioned relative to one another, the image sensor can be positioned relative to the exit window and supported during the positioning operation.

From EP-A No. 0231382 which corresponds to U.S. Pat. No. 4,761,685 it is known per se to secure a holder of iron or a similar material to both the image sensor and the relevant exit window, and solder both holders to one another in an aligned position. However, during the positioning of the holders described in the said Application they do not form an integrated entity which supports the image sensor, and cooperation between the holders, enabling them to be positioned relative to each other, is not suggested.

SUMMARY OF THE INVENTION

A preferred embodiment of an optical assembly in accordance with the invention is characterized in that the elastically deformable element surrounds the apertures in the holder plates of the associated holder. Since the elastically deformable element surrounds the apertures, the holder plates can be tilted in any desired position relative to one another in a simple, defined manner, so that the image-receiving surface of the image sensor can be placed in any desired position relative to the relevant exit window. Alternative embodiments of an optical assembly in accordance with the invention are characterized in that the elastically deformable element comprises separate segments which at least partly surround the apertures in the holder plates of the associated holder, or in that the elastically deformable element comprises four separate segments which define the vertices of an imaginary rectangle which surrounds the apertures in the holder plates of the associated holder. A further preferred embodiment of an optical assembly in accordance with the invention is characterized in that the fixation means is a UV-light curable adhesive. If a UV-light curable adhesive is used, the two holder plates of the solid-state image sensor can be rapidly secured to one another in the desired position, such that during the fixation any variation in the adjusted position is minimal.

A further preferred embodiment of an optical assembly in accordance with the invention is characterized in that the image-receiving surface of the solid-state image sensor is substantially parallel to the exit window. Consequently, the image-receiving surface of each solid-state image sensor is sufficiently accurately positioned relative to the relevant exit window, and a camera can optimally record an image to be picked up.

A method of manufacturing an optical assembly having a colour separation system for a camera, in which, during a process step, a solid-state image sensor is fixed opposite an exit window in an aligned position, is characterized in accordance with the invention in that before the solid-state image sensor is fixed opposite the exit window, a holder is formed from a first and a second holder plate and an elastically deformable element provided between the holder plates, the holder plates being tiltable relative to one another by virtue of the elastically deformable element, the solid-state image sensor is fixed to the second holder plate, the holder with the solid-state image sensor is arranged over the exit window, a test pattern is imaged on the entrance window of the colour separation system, the first and the second holder plates are tilted relative to one another until the image sensor records a desired test pattern, and in that the two holder plates are secured to one another in an aligned position by means of a fixation element. On account of this, the solid-state image sensor can be rapidly and accurately fixed in a desired position opposite the relevant exit window.

BRIEF DESCRIPTION OF THE DRAWINGS

A few exemplary embodiments of an optical assembly in accordance with the invention will now be described with reference to the drawings, in which.

DETAILED DESCRIPTION OF THE PREFERRED EMBODIMENTS

Figure 1:
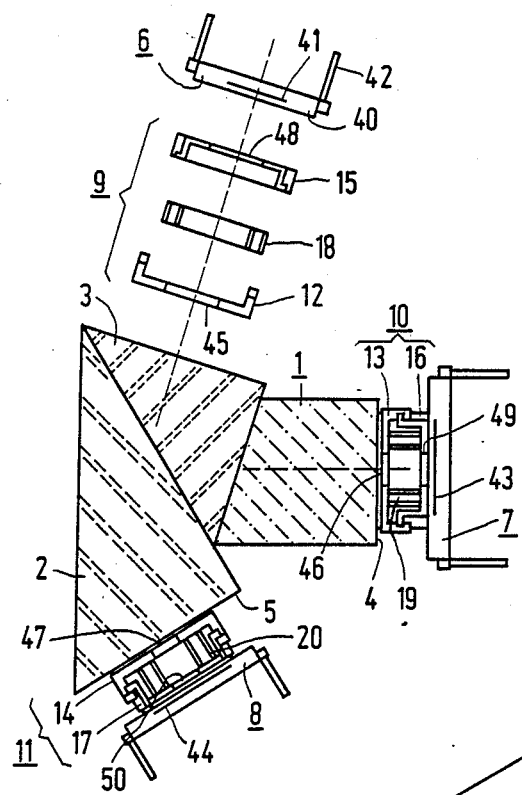
FIG. 1 is a diagrammatic, sectional view of an optical assembly in accordance with the invention.

By way of example, the invention will be described by means of an optical assembly for a colour television camera having a colour separation system 1 with one entrance window 2 and three exit windows 3, 4 and 5, as schematically shown in FIG. 1. A solid-state image sensor 6, 7, 8 is fixed to each exit window 3, 4, 5 by means of an associated holder 9, 10, 11. A solid-state image sensor (for example 6) generally comprises an envelope 40 containing an image-receiving surface 41 and to which connection pins 42 are secured for providing an output according to an image to be recorded. Each solid-state image sensor 6, 7, 8 is fixed to its corresponding exit window 3, 4, 5 in such a way that the image-receiving surfaces 41, 43, 44 are parallel to the exit windows For clarity, the individual parts of the holder 9 are separately shown in FIG. 1. Each holder 9, 10, 11 comprises a first holder plate 12, 13, 14 having an aperture 45, 46, 47 and which is secured to the relevant exit window 3, 4, 5, and a second holder plate 15, 16, 17 having an aperture 48, 49, 50 and to which the associated solid-state image sensor 6, 7, 8 is fixed. An elastically deformable element 18, 19, 20 is provided between each first holder plate 12, 13, 14 and each second holder plate 15, 16, 17. In the assembled state of the holder, the image sensor is brought into a desired position relative to the corresponding exit window by virtue of the cooperation of the elastically deformable element with the two holder plates of each holder. This desired position is fixed by securing the two holder plates to each other by means of a fixation element, for example an adhesive.

Figure 2:
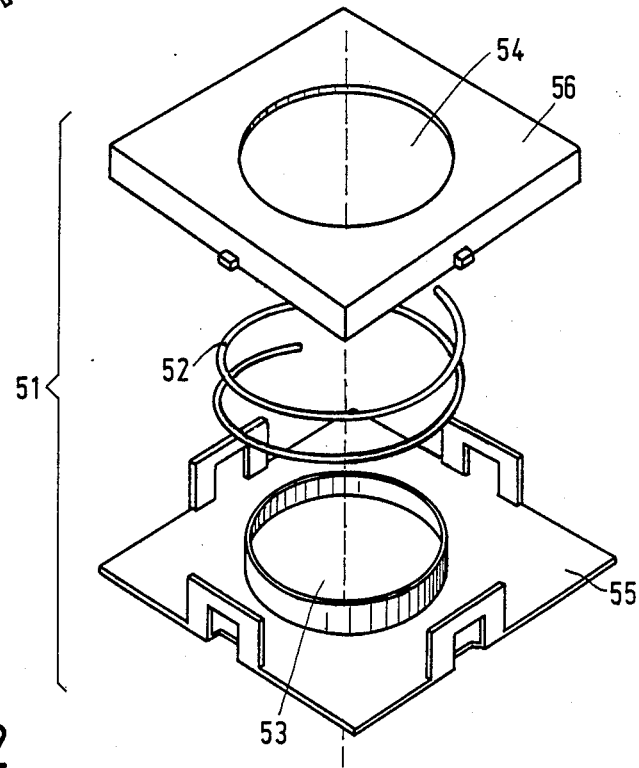
FIG. 2 is a diagrammatic, perspective view of an embodiment of a holder for an image sensor of an optical assembly in accordance with the invention.

FIG. 2 is a diagrammatic view of an embodiment of a holder 51 for an optical assembly in accordance with the invention, in which an elastically deformable element 52 surrounds apertures 53 and 54 of holder plates 55 and 56. In this embodiment, the elastically deformable element 52 is a spiral-shaped spring. For clarity, the individual parts of the holder 51 are shown separately. Since the elastically deformable element 52 surrounds the apertures the holder plates 55 and 56 can be tilted relative to one another into any desired position in a simple and defined manner, as will be described hereinafter. Alternative embodiments of a holder for an optical assembly, in which the holder plates of the holder can be placed in any desired position relative to one another are shown in FIGS. 3 and 4.

Figure 3:
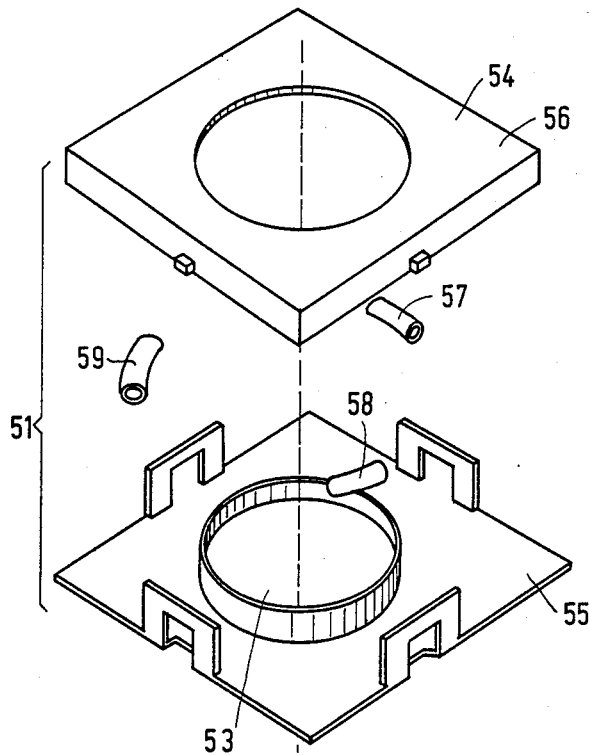
FIG. 3 is a diagrammatic, perspective view of an alternative embodiment of a holder for an optical assembly in accordance with the invention.

In FIG. 3, the elastically deformable element 52 comprises three separate segments 57, 58 and 59 which surround the apertures 53 and 54 of the holder plates 55 and 56. In this embodiment, the separate segments 57, 58, 59 are rubber tubes.

Figure 4:
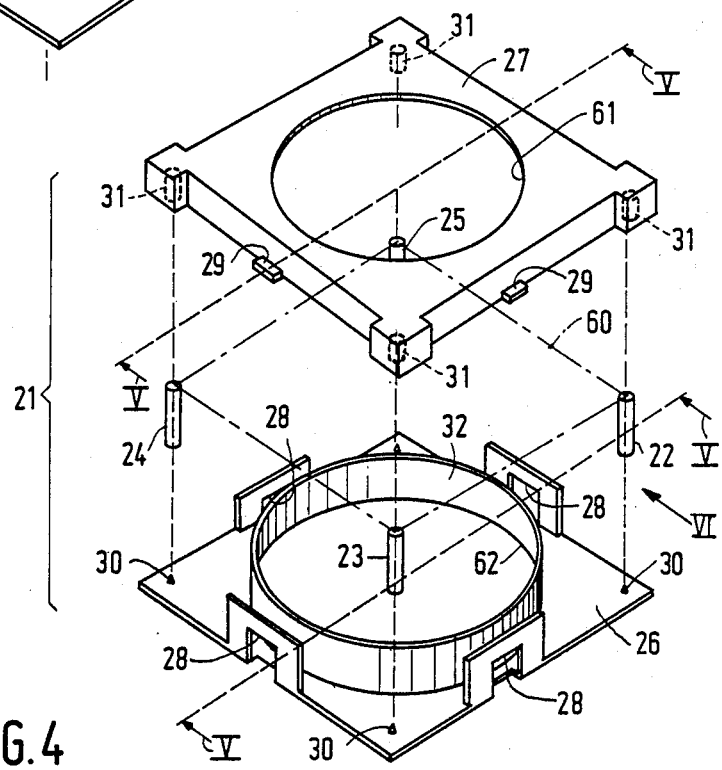
FIG. 4 is a diagrammatic, perspective view of a further alternative embodiment of a holder for an optical assembly in accordance with the invention.

FIG. 4 shows an alternative embodiment of a holder 21 for an optical assembly in accordance with the invention, in which the elastically deformable element comprises four cylindrical elements 22, 23, 24 and 25 which define the vertices of an imaginary rectangle 60 surrounding apertures 61, 62 of holder plates 26, 27. For clarity, the individual parts of the holder 21 are shown separately.

Figure 5:
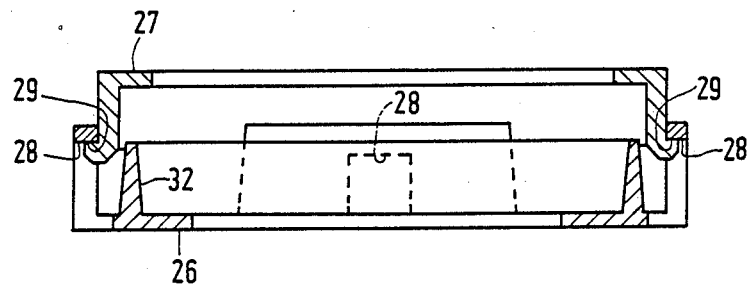
FIG. 5 is a diagrammatic, sectional view of the holder for an optical assembly, taken on the line V—V in FIG. 4.

The function of the elastically deformable element of the holder will be explained by means of the method of manufacturing an optical assembly for a television camera in accordance with the invention, and will be described, by way of example, with reference to the FIGS. 4 up to and including 8. As is shown in FIG. 4, the holder 21 is formed by assembling the first holder plate 26 and the second holder plate 27 together the rubber elements 22, 23, 24, 25 being inserted between them. The holder plates 26 and 27 are loosely coupled together and are provided with respective cooperating stop surfaces 28 and 29 which, in the assembled condition, are urged against one another by the rubber elements as the diagrammatic, sectional view of FIG. 5 shows. In this assembled condition the spacing between the first holder plate 26 and the second holder plate 27 is substantially constant throughout the entire surface of the holder plates.

Figure 6:
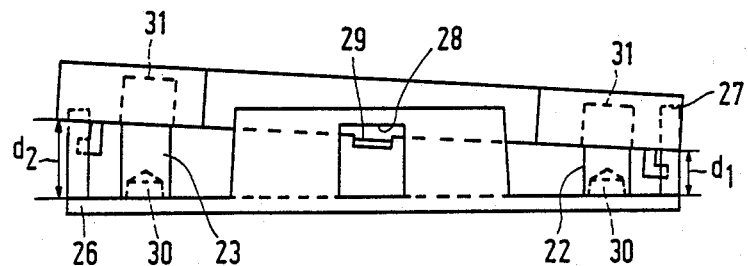
FIG. 6 is a diagrammatic side view of the holder for an optical assembly, viewed in the direction of the arrow VI shown in FIG. 4, and FIGS. 7 and 8 are diagrammatic, sectional views of a solid-state image sensor fixed to an exit window.

The two holder plates 26, 27 can be tilted relative to one another, for example, by pressing the holder plates towards one another at the location of the rubber element 22, as is shown in the schematic front view of FIG. 6. On account of the cooperation of the rubber elements 22, 23, 24, 25 with the holder plates the distance between the holder plates can be varied from, for example, $d_1$, at the location of the rubber element 22, to $d_2$, at the location of the rubber element 23. If the pressure is removed at the location of the rubber element 22, the rubber elements will again urge the holder plates to a position in which their stop surfaces abut.

Due to the fact that the rubber elements are elastically deformable it is clear that the holder plates can be tilted relative to one another in any desired position.

In order to avoid a variation in the position of the rubber elements when pressure is applied, the first holder plate 26 and the second holder plate 27 are provided with projections 30 and apertures 31 respectively which locate opposite ends of the rubber elements.

Figure 7:
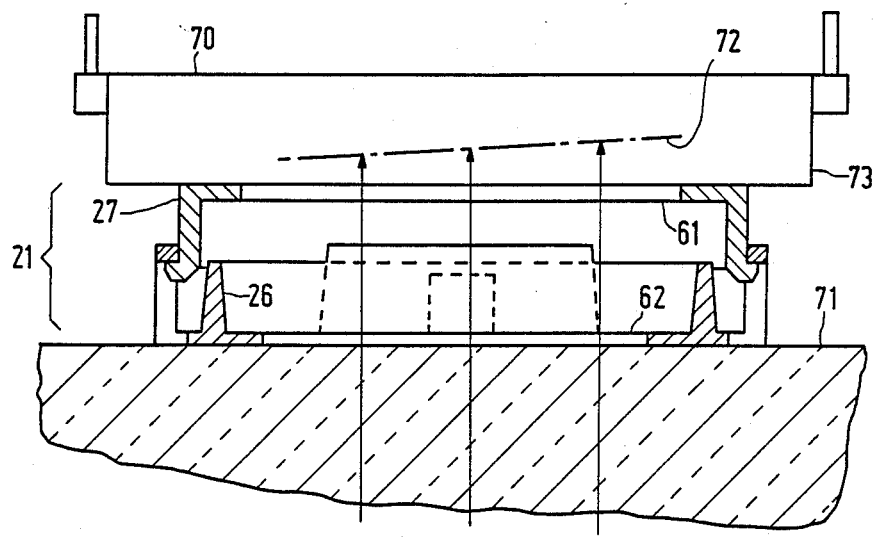

The solid-state image sensor 70 is fixed to the second holder plate 27, for example, by means of an adhesive (FIG. 7).

An image-receiving surface 72 of the solid-state image sensor 70 is accommodated in an envelope 73 of the image sensor 70 and it is assumed that its exact position relative to the envelope 73 is unknown.

Figure 8:
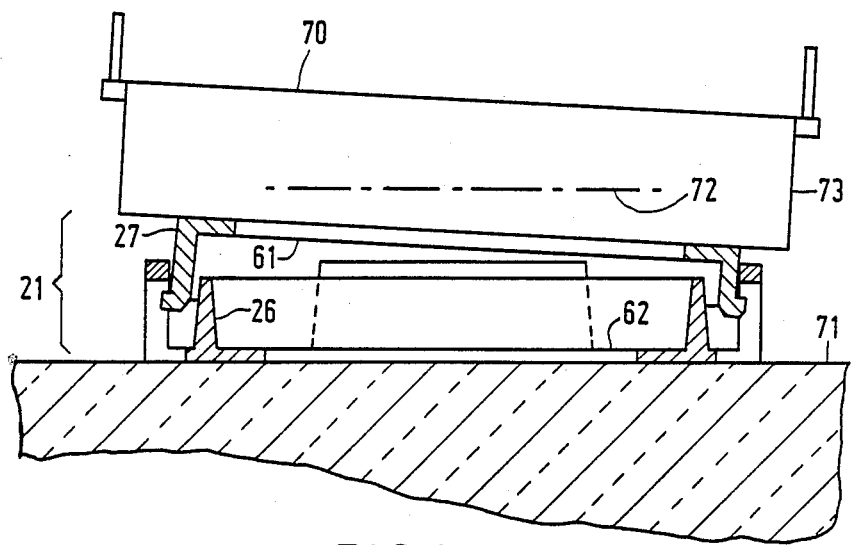

To place the solid-state image sensor 70, or more precisely the image-receiving surface 72, into a desired position relative to the exit window 71 opposite which the said image sensor is arranged, a test pattern is displayed on the entrance window of the colour-separation system, the test pattern being incident on the image-receiving surface 72 (see arrows in FIG. 7) via the exit window 71 and passing through apertures 61, 62 of the holder 21. This test pattern is recorded by connecting the image sensor to a monitor (not shown in FIG. 7). As is schematically shown in FIG. 8, the image-receiving surface 72 can be oriented parallel to the exit window 71 by tilting the image sensor 70 until a desired test pattern is recorded. Subsequently, the two holder plates are rigidly secured to one another in this desired relative position. This can be carried out, for example, by means of an adhesive. Since an adhesive needs some time to cure the image sensor has to be held in the desired position during the curing time. Preferably, a UV-curable adhesive is used so that the fixation can be carried out rapidly and in a defined manner.

If in order to obtain a properly functioning camera it is additionally required that the central axis extending perpendicularly to the image-receiving surface coincides substantially with the optical axis of the relevant exit window, the image sensor is displaced over the exit window until a desired test pattern is displayed, after which the first holder plate 26 is secured to the exit window. If this displacement is not necessary the first holder plate 26 can be secured to the exit window at an earlier stage.

I claim:

1. An optical assembly for a camera, comprising a colour-separation system having an entrance window and at least one exit window, and a solid-state image sensor which is fixed opposite the or each exit window, and which comprises an image-receiving surface accommodated in an envelope, characterized in that each solid-state image sensor is fixed to the exit window by means of a holder which comprises two holder plates having facing apertures and which are fixed to the exit window and the solid-state image sensor respectively, an elastically deformable element cooperating with and acting between the two holder plates, the holder plates being secured in a desired position relative to one another by fixation means.

2. An optical assembly as claimed in claim 1, characterized in that the elastically deformable element surrounds the apertures of the holder plates.

3. An optical assembly as claimed in claim 1 characterized in that the elastically deformable element comprises separate segments which, at least partly, surround the apertures in the holder plates.

4. An optical assembly as claimed in claim 1 characterized in that the elastically deformable element comprises four separate segments which define the vertices of an imaginary rectangle which surrounds the apertures in the holder plates.

5. An optical assembly as claimed in claim 1, characterized in that the fixation means is UV-light curable adhesive.

6. An optical assembly as claimed in claim 1, characterized in that the image-receiving surface of the solid-state image sensor is substantially parallel to the exit window.

7. A method of manufacturing an optical assembly comprising a colour-separation system for a camera, in which during a process step a solid-state image sensor is fixed opposite an exit window in an aligned position, characterized in that before the solid-state image sensor is fixed opposite the edit window, a holder is formed from a first and a second holder plate and an elastically deformable element provided between the holder plates, the holder plates being tiltable relative to one another by virtue of the elastically deformable element, the solid-state image sensor is fixed to the second holder plate, the holder with the solid-state image sensor is arranged over the exit window, a test pattern is displayed on the entrance window of the colour-separation system, the first and the second holder plates are tilted relative to one another until the image-sensor records a desired test pattern, and in that the two holder plates are secured to one another in an aligned position by means of a fixation element.

* * * * *